Patented Nov. 3, 1925.

1,560,132

UNITED STATES PATENT OFFICE.

GEORGE WILSON ACHESON, OF NEWARK, NEW JERSEY.

PROCESS OF MAKING RUBBER COMPOSITIONS.

No Drawing.  Application filed June 23, 1922. Serial No. 570,496.

*To all whom it may concern:*

Be it known that I, GEORGE WILSON ACHESON, a citizen of the United States, residing at Newark, in the county of Essex and State of New Jersey, have invented certain new and useful Improvements in Processes of Making Rubber Compositions, of which the following is a specification.

In my copending application Serial No. 396,562, filed July 15, 1920, I have described and claimed a rubber composition containing an inorganic filling material in an initially-deflocculated state, and the process of making such composition.

For the purposes of clearness, and particularly because the term "deflocculated" has been incorrectly and loosely used in the patent and other literature, I will here define the said term as comprising a sub-division of matter brought about by the action thereon of certain organic bodies or agents known in this art as "deflocculating agents." When such deflocculating agents are incorporated with the body to be deflocculated, the latter being in presence of a sufficiently restricted proportion of water or other suitable liquid, and the resulting heavy paste is subjected to prolonged mechanical working, the component particles or a portion of them undergo "deflocculation" with the result that they are sub-divided into extremely minute masses, which in some cases at least are now believed to be of molecular dimensions, or more or less closely to approximate molecular dimensions. Such deflocculated particles are beyond the limits of visibility under ordinary microscopic conditions, but appear under the ultra-microscope as brilliant points without discernible form but in intense vibratory movement.

The present invention in one of its aspects comprises an improvement upon the process of my above application. Like said process it is applicable to a wide variety of inorganic filling materials which are susceptible of deflocculation, of which filling materials lamp black or gas black and clay may be taken as typical examples. I prefer to proceed as follows, it being understood that my invention is not limited to the particular manipulations below described, nor to the use of the particular solids (carbon black and clay) which I now prefer to incorporate with the rubber.

An appropriate filling material, such for example as English china clay, is first subjected to deflocculation by subjecting a paste containing the same to sufficiently prolonged attrition in presence of an organic deflocculating agent. This operation is carried out in known manner, for example substantially as disclosed in the prior patent to E. G. Acheson, No. 1,345,306, patented June 29, 1920. A suitable deflocculating agent is the product of reaction of hexamethylene-tetramine upon the heat-conversion products of starchy materials, as disclosed in U. S. Patent 1,345,305, patented June 29, 1920, to E. G. Acheson.

Following the deflocculation the product is diluted by pure water to a creamy or flowing consistence, and is subjected to a process of sedimentation or "thickening" preferably in a "thickener" of the Dorr type. The suspended portion flowing from the thickener comprises the whole of the deflocculated or permanently suspensible material, together with such fine particles as have not had time to subside under the operating conditions.

At this stage a further sedimentation in tanks or otherwise may be resorted to in order to isolate further the deflocculated particles from the fine particles which are only temporarily suspensible; but for most purposes this is unnecessary if the first operation of sedimentation or thickening has been carefully conducted. The next step consists in flocculating the suspended material by the addition of an appropriate reagent such as a dilute acid or an acid salt, alum being preferred. The precipitated material is then dried at a low temperature, and in the form of an impalpable powder is stirred into gasoline or equivalent rubber solvent. This results in a thin creamy mixture.

To this cream I add a solution of rubber in gasoline or other appropriate solvent, which is preferably the same solvent which was used for thinning the air-dried clay.

Satisfactory results are obtained by using a 4% solution of para rubber in gasoline. The quantity of rubber thus added may of course be widely varied, depending entirely upon the relative proportions of clay and rubber desired in the immediate product. As a rule I so proportion the materials that the precipitate of clay and rubber resulting from the operation next to be described will carry from 30 to 70 per cent of clay.

I now introduce the clay-rubber mixture into an excess of an organic liquid which is not a solvent for rubber, but which is at least partially miscible with the gasoline or other rubber solvent used in the preceding step. At present I prefer to employ acetone, although other ketones or alcohols or mixtures thereof may bring about the same result, to wit: immediate separation of the clay and rubber in extremely intimate association, and in the form of a plastic mass from which the liquid (comprising in this case a mixture of gasoline and acetone) can readily be expressed.

The clay-rubber mixture thus prepared is now fully dried, with recovery of the last portions of the gasoline and acetone. The entire gasoline-acetone mixture, which is substantially or completely free from dissolved rubber, is then fractionally distilled with direct recovery of its components in condition for re-use in a repetition of the process.

The clay-rubber mixture prepared as above is directly available for use in various ways. Assuming that the proportion of clay to rubber is higher than is desired in the commercial product, it may be directly incorporated with additional rubber on the usual mixing rolls. This is my preferred procedure inasmuch as thereby the amount of solvent entering into the process is kept at a minimum.

The sulfur necessary for the vulcanization may be incorporated during this mixing stage. Or if preferred the sulfur, in appropriate proportions according to the grade of rubber desired, may be mixed with the original clay and deflocculated with it; or it may be mixed with the clay after the latter has been deflocculated, and either before or after the precipitation of the clay; or the sulfur may be separately subjected to defloccation and mixed with the stock at any convenient or desired operating stage. All such procedures I regard as within my invention.

It should be clearly understood that my invention is not limited to the materials or manipulations described above by way of example and illustration; but that the process may be variously modified within the scope of my claims in accordance with the properties which it is desired to impart to the product.

Although I prefer in every case to submit the inorganic solid which is to be incorporated with the rubber to defloccation as a preparatory step, certain advantages as ragards intimacy of mixture may nevertheless be secured without such preparation, especially when the particles of the solid are already very fine and substantially uniform, as in the case of carbon blacks and certain clays. I regard it therefore as within my invention to omit the preparatory deflocculating step, and to incorporate the fine, dry, solid filling material directly with the rubber solution, followed by the precipitation of the mass by means of acetone or its equivalent as already described.

Also my invention is not limited to flocculating the material before adding it to the rubber solution, since I may introduce the deflocculated suspension in water directly into the rubber solution and agitate it therewith until the solid material is taken up by the rubber solution, with separation of water which may be drawn off and rejected, the rest of the operation proceeding substantially as above.

I claim:

1. Process of making a rubber composition comprising subjecting an inorganic solid to a deflocculating operation and recovering the initially-deflocculated product in substantially dry condition; mixing therewith a rubber solution; precipitating the rubber in presence of the initially-deflocculated solid by means of an organic liquid having an action essentially similar to that of acetone; and separating the rubber mixture from the liquid components.

2. Process of making a rubber composition comprising subjecting an inorganic solid to a deflocculating operation and recovering the initially-deflocculated product in substantially dry condition; mixing therewith a rubber solution; precipitating the rubber in presence of the initially-deflocculated solid by means of an organic liquid having an action assentially similar to that of acetone; separating the rubber mixture from the liquid components; and incorporating therewith a further proportion of rubber.

3. Process of making a rubber composition comprising subjecting an inorganic solid to a deflocculating operation and recovering the initially-deflocculated product in substantially dry condition; suspending the same in a rubber solvent and mixing therewith a rubber solution; precipitating the rubber in presence of the initially-deflocculated solid by means of an organic liquid having an action essentially similar to that of acetone; and separating the rubber mixture from the liquid components.

4. Process of making a rubber composition comprising subjecting an inorganic solid to a deflocculating operation and recovering the initially-deflocculated product in substantially dry condition; suspending the same in a rubber solvent and mixing therewith a rubber solution; precipitating the rubber in presence of the initially-deflocculated solid by means of an organic liquid having an action essentially similar to that of acetone; separating the rubber mixture from the liquid components; and incorporating therewith a further proportion of rubber.

In testimony whereof, I affix my signature.

GEORGE WILSON ACHESON.